United States Patent
Sylvester, II et al.

(10) Patent No.: US 10,915,392 B2
(45) Date of Patent: Feb. 9, 2021

(54) INTEGRATION ERROR DETECTION AND CORRECTION SYSTEM

(71) Applicant: PayPal, Inc., San Jose, CA (US)

(72) Inventors: Gregory Sylvester, II, San Jose, CA (US); Wesley Williams, San Jose, CA (US); Robert Bramwell Flowers, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 15/854,659

(22) Filed: Dec. 26, 2017

(65) Prior Publication Data

US 2019/0196899 A1 Jun. 27, 2019

(51) Int. Cl.
| | | |
|---|---|---|
| *G06F 11/00* | (2006.01) | |
| *G06F 11/07* | (2006.01) | |
| *G06Q 20/10* | (2012.01) | |
| *G06N 20/00* | (2019.01) | |
| *G06Q 20/40* | (2012.01) | |
| *G06Q 20/02* | (2012.01) | |

(52) U.S. Cl.
CPC .......... *G06F 11/0793* (2013.01); *G06F 11/07* (2013.01); *G06F 11/0736* (2013.01); *G06F 11/0745* (2013.01); *G06N 20/00* (2019.01); *G06Q 20/023* (2013.01); *G06Q 20/102* (2013.01); *G06Q 20/4016* (2013.01)

(58) Field of Classification Search
CPC ............. G06F 11/0793; G06F 11/0736; G06F 11/0745; G06N 20/00; G06Q 20/102
USPC .................................................. 714/799, 819
See application file for complete search history.

(56) References Cited

U.S. PATENT DOCUMENTS

| | | | | |
|---|---|---|---|---|
| 2004/0117300 | A1* | 6/2004 | Jones | G06Q 20/10 705/39 |
| 2010/0145857 | A1* | 6/2010 | Davila | G06Q 20/042 705/44 |
| 2010/0211504 | A1* | 8/2010 | Aabye | G06Q 20/10 705/44 |
| 2011/0264501 | A1* | 10/2011 | Clyne | G06Q 20/10 705/14.25 |
| 2012/0066065 | A1* | 3/2012 | Switzer | G06Q 20/10 705/14.53 |
| 2012/0150737 | A1* | 6/2012 | Rottink | G06O 20/102 705/40 |
| 2013/0238455 | A1* | 9/2013 | Laracey | G06Q 20/108 705/21 |

(Continued)

*Primary Examiner* — Albert Decady
*Assistant Examiner* — Osman M Alshack
(74) *Attorney, Agent, or Firm* — Haynes and Boone, LLP

(57) ABSTRACT

Methods, systems, and computer program products for detecting and correcting integration issues and errors between different computer systems are disclosed. For example, a computer-implemented method may include collecting transaction data for each one of a plurality of respective merchants where the transaction data is associated with service integration between computer systems associated with the respective merchants and one or more service provider computer systems, analyzing the transaction data across a plurality of respective issue detection models, generating for each one of the plurality of merchants action data corresponding to one or more of the respective issue detection models based on the analyzing, and providing each one of the plurality of merchants with the respective generated action data.

20 Claims, 7 Drawing Sheets

(56) References Cited

U.S. PATENT DOCUMENTS

| | | | |
|---|---|---|---|
| 2013/0332255 A1* | 12/2013 | Carlson | G06Q 30/0226 705/14.27 |
| 2014/0019352 A1* | 1/2014 | Shrivastava | G06Q 20/3674 705/41 |
| 2014/0040134 A1* | 2/2014 | Ciurea | G06Q 20/383 705/44 |
| 2014/0310174 A1* | 10/2014 | Heeter | G06Q 30/06 705/44 |
| 2015/0073989 A1* | 3/2015 | Green | G06Q 20/405 705/44 |
| 2015/0363840 A1* | 12/2015 | Gupta | G06F 16/285 705/347 |
| 2017/0148027 A1* | 5/2017 | Yu | G06Q 20/4016 |

* cited by examiner

API Errors – Top 5 — 502

| Code | Description | Transactions blocked | Corrective action — 504 |
|------|-------------|---------------------|-------------------------|
| 10415 | Payment has been made using an invoice | 15000 | Help increase your cart conversions to fix these issues by following the instructions here |
| 10413 | Items in cart do not match order | 10000 | |
| 10415 | Payment has been made using an invoice | 5000 | |
| 10413 | Items in cart do not match order | 2000 | |
| 10413 | Items in cart do not match order | 1000 | |

Checkout issues — 506

Your PayPal check out experience can be improved by eliminating an unnecessary step in the process. You could improve the number of successful transactions by allowing users to complete the transaction on PayPal.

Recommendation — 508

ⓘ Use PayPal to eliminate unnecessary check in your flow. Learn more

FIG. 5

600
602
Recommended Checkout settings for improving conversion rates
Auto accept currency  Always
Shipping limited to domestic 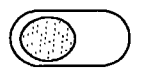 Always
Save
FIG. 6

INTEGRATION ERROR DETECTION AND CORRECTION SYSTEM

TECHNICAL FIELD

The present disclosure generally relates to computer systems and, more particularly, to the integration of computer systems, computer networks, and Internet services.

BACKGROUND

Computer systems enable electronic transactions, such as data transfers and electronic commerce, to be conducted between entities virtually anywhere in the world through computer networks and Internet services. Electronic commerce or e-commerce generally refers to the process of buying and selling goods online. For a user, electronic commerce generally involves visiting a merchant website, locating and adding items to a shopping cart, and providing payment information during a checkout process to complete an order through a computing device, such as a smart phone or personal computer.

Sometimes users are unable to complete an electronic transaction, for example, due to technical issues, integration errors between systems, or overly restrictive security settings. In such cases, a user may abandon the process and the other party to the transaction loses the transaction without much insight.

Such missed opportunities can result in unhappy users, lost sales, and merchant frustration even if the underlying technical issues are eventually discovered and resolved. Therefore, providing new and improved ways of automated error detection and correction is of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

FIG. 3 is an example checkout insights user interface in accordance with examples of the present disclosure.

FIG. 5 is an example user interface for communicating and resolving application programming interface (API) errors in accordance with examples of the present disclosure.

FIG. 6 is an example user interface for providing suggested optimized application settings in accordance with examples of the present disclosure.

DETAILED DESCRIPTION

Systems, methods, and computer program products for providing automated and semi-automated error detection and correction are disclosed.

In examples of the present disclosure, an issue detection and correction system provides automated and/or semi-automated issue detection and correction services based on transactional data generated between computer systems of different parties. For example, the issue detection and correction system may analyze transactional data generated by different applications and computer systems using one or more issue detection models. The system then may filter detected issues based on one or more suppression rules and identify one or more optimizations or corrections for respective systems based on a filtered set of detected issues. The system also may generate and provide one or more parties with respective communication channels for delivering information regarding detected errors, suggested optimizations, recommendations, setting updates, code fixes, etc. Further, the system also may implement one or more corrections (e.g., setting optimization adjustments, code updates, etc.) identified based on one or more detected issues. Such corrections may be implemented by the system automatically or when approved by a user or administrator.

Accordingly, aspects of the present disclosure provide automated and semi-automated ways of detecting and correcting various types of integration inefficiencies and errors. As such, examples of the present disclosure provide increased speed and accuracy in identifying and correcting application and computer system issues.

Figure 1:
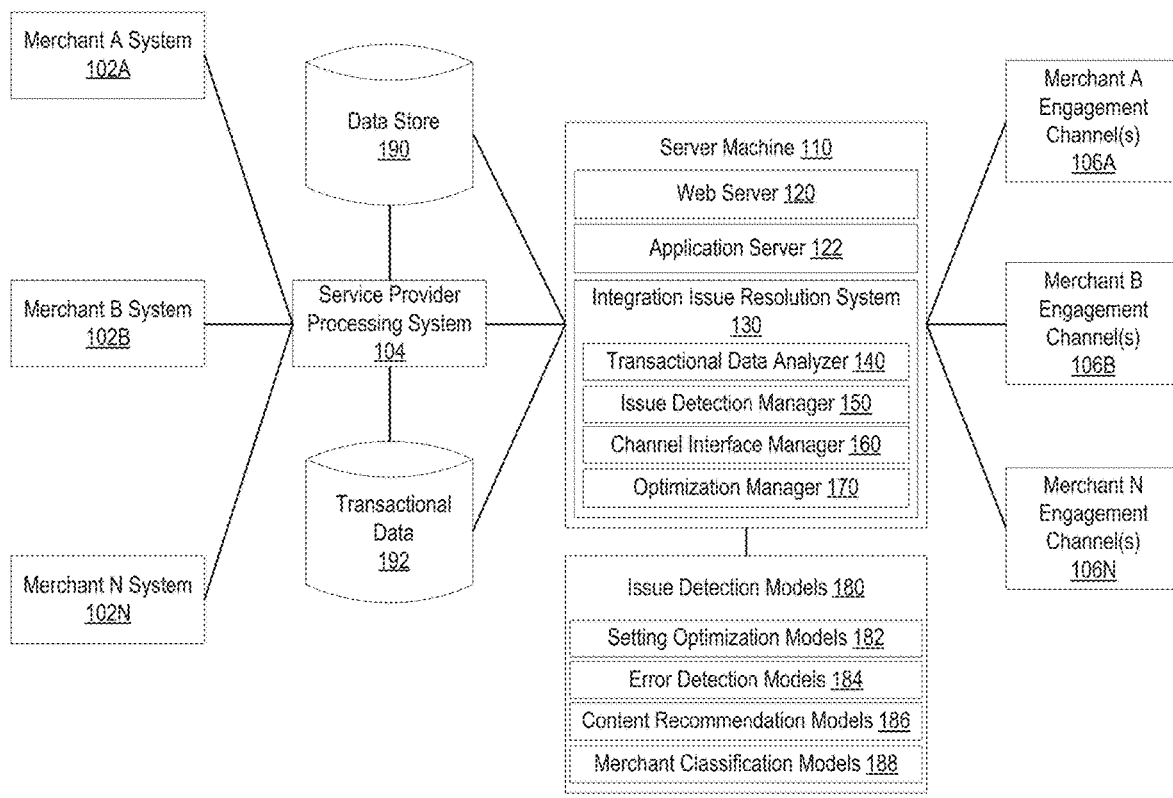
FIG. 1 is a block diagram illustrating a system architecture in accordance with various examples of the present disclosure.

FIG. 1 illustrates an exemplary system architecture 100 in which examples of the present disclosure may be implemented. System architecture 100 includes a plurality of merchant systems 102A, 102B, 102N, service provider processing system 104, merchant engagement channels 106A, 106B, 106N, one or more server machines 110, issue detection models 180, one or more data stores 190, and transactional data 192 connected via one or more networks (not shown).

Networks may be a public network (e.g., the Internet), a private network (e.g., local area network (LAN) or wide area network (WAN)), or any combination thereof. In an example, networks may include the Internet, one or more intranets, wired networks, wireless networks, and/or other appropriate types of communication networks. Networks also may comprise a wireless telecommunications network (e.g., cellular phone network) adapted to communicate with other communication networks, such as the Internet. In addition, networks may include one or more short-range wireless networks or beacon networks.

In general, merchant systems 102A-102N may include and/or be provided using one or more computing devices, such as server machines, personal computers (PC), laptops, smart phones, tablet computers, server computers, wearable computing devices, and/or any other type of computing device or machine. In addition, merchant systems 102A-102N generally may refer to electronic commerce computer systems that support the buying and selling of goods and services over the Internet. For example, merchant systems 102A-102N may include one or more online shopping websites, any type of online marketplace, and/or web or mobile applications that allow the buying, selling, and/or the exchange of goods between different parties.

In some examples, one or more merchant systems 102A-102N may include one or more websites that allow consumers or users of those websites to directly buy goods or services from a seller over the Internet using any web browser. For example, some merchants may sell products to consumers or businesses directly via a merchant-owned Internet website. Some merchants also may sell products and services to others by listing those offerings on a third-party website, such as an online marketplace or an online retailer website.

Most e-commerce web sites generally provide online shoppers with virtual shopping cart applications that allow online consumers to browse items, make multiple item selections, select shipping options, view taxes and costs up-front, and then pay for the items in a single payment. Such virtual shopping carts may be provided directly as part of an e-commerce web site by a website operator or merchant. Virtual shopping carts also may be provided by a third-party such as a payment service provider, and integrated into an e-commerce website by a website operator or merchant.

In general, a virtualized e-commerce shopping cart may provide or be integrated with a checkout process that allows an online shopper to review, finalize, confirm, fund, and submit an online order to purchase collected items. In various examples, a virtual shopping cart and/or a checkout service, may be provided by a service provider processing system. For example, a payment service provider may provide a virtual shopping cart with integrated checkout and payment services that allows online shoppers to fund and submit online orders. Such checkout services may be in-context flows where online users complete the checkout process while remaining on a merchant's e-commerce website. Checkout services also may be out of context where online users are temporarily redirected to another website or presented with a supplemental checkout service website to complete an order.

Service provider processing system 104 generally refers to an online system for providing one or more different types of services to various different merchant systems 102A-102N. For example, service provider processing system 104 may include any number physical and/or virtual machines that provide computer programs, software applications, application programming interfaces (APIs), or web services that benefit one or more merchant systems 102A-102N. Thus, service provider processing system 104 generally may communicate with various different merchant systems 102A-102N to provide online services over the Internet.

In some examples, service provider processing system 104 may include one or more of an online shopping cart application or service, an online e-commerce checkout application or service, and/or an online payment acceptance and processing application or service for online transactions. For example, such online services may be integrated into new and/or existing e-commerce implementations using application code, API calls, and web services based on Internet protocols. As such, service provider processing 104 system applications may be integrated with various merchant systems 104 via a private network or a public network such as the Internet.

In various examples, service provider processing system 104 provides application services over the Internet allowing merchants to incorporate shopping cart, checkout, and/or payment application services into e-commerce applications and/or websites. For example, a service provider processing system 104 may allow a merchant or website operator to integrate a shopping cart application into an e-commerce application or website using "add cart" and/or "view cart" application buttons. User interface controls, application functionality, and associated system calls associated with such functionality then may be provided by service provider processing system 104.

The service provider also may allow each of one or more merchants to design a checkout experience for various e-commerce applications and websites based on services provided by service provider processing system 104. For example, service provider processing system 104 may allow each merchant to customize the size, layout, and/or placement of the checkout and content and controls. Such content may include, but is not limited to, checkout user interface content, layout, buttons, images, icons, and/or any other visual aspects associated with a checkout and/or payment process.

Service provider processing system 104 also may provide, for example, one or more different merchant checkout settings to allow merchants to further define and control the processing of e-commerce transactions. For example, service provider processing system 104 may provide one or more individual and/or combined merchant settings that allow respective merchants to offer or block one or more different services from a checkout process. For example, one or more settings may be used to allow or disallow transactions originating from within or outside a geographic location, to allow or disallow transactions with shipments to or outside of a geographic location, to allow or disallow use of particular currencies to fund transactions, to provide a "buy now" option, to accept or not accept particular types of payment funding options (e.g., credit cards, online payment accounts, cryptocurrency), etc.

Other example merchant checkout customization settings may include an option to auto-return a buyer to the merchant's website, whether to include a company logo, whether to require use of a payment service provider account, whether to offer buyers an option for recurring payments, whether to provide customer support contact information, whether to obtain a telephone or other contact information from a buyer, whether to cross-sell available products or services to a buyer, tax calculation settings, shipping options, shipping fee calculations and settings, etc. Other similar settings may implemented accordingly to allow a merchant to determine what types of transactions, terms, and payment methods will be offered and accepted.

In various examples, a service provider of service provider processing system 104 processes payment information submitted by a user during an online checkout process to complete an order for the purchase of items by a user. In some examples, control of an online transaction then may be returned to an originating e-commerce application or website. In other examples, a user may be redirected back to an originating website or application.

In addition, service provider processing system 104 may utilize one or more data stores 190 to provide various services to merchant systems 102A-102N. Data stores 190 generally refer to persistent storage capable of storing various types of data, such as text, audio, video, and image content. In some examples, data stores 190 may include a network-attached file server, while in other examples data stores 190 may include other forms of persistent storage such as a relational database, an object-oriented database, and so forth.

In various examples, service provider processing system 104 collects and analyzes various different types of transactional data 192 associated with services provided across different merchant systems 102A-102N. For example, service provider processing system 104 may collect various transactional data 192 during interaction with different merchant systems 102A-102N when providing shopping cart, checkout, and/or payment services. Service provider processing system 104 also may receive various types of transactional data 192 including supplemental or additional data used to augment real-time data collected during interactions with merchant systems 102A-102N.

For example, various types of transactional data 192 may include user shopping cart interactions or application programming interface (API) calls indicating details about items added, removed, changed, or modified by users during interaction with a shopping cart service. Other transactional data may include successful and unsuccessful API calls between service provider processing system 104 and each of one or more different merchant systems 102A-102N, merchant checkout settings and preferences, website navigation data, data describing information about completed sessions/transactions, data describing information about incomplete sessions/transactions, data describing information about abandoned sessions/transactions, purchased items, payment methods, payment method success for various respective payment types, etc.

Service provider processing system 104 may receive additional transactional data 192 offline or as part of one or more separate processes. For example, additional transactional data 192 such as user feedback, user ratings, security data, and exchanges or returns may be used to augment or supplement transactional data 192 collected during interactions between service provider processing system 104 and various different merchant systems 102A-102N.

In an example, service provider processing system 104 receives transactional data 192 and other data associated with online payment accounts. For example, service provider processing system 104 may receive data associated with one or more industries (e.g., auto, retail, finance, insurance, non-profits), data associated with one or more industry segments (e.g., fashion, jewelry, churches), data associated with one or more geographic locations (e.g., continents, countries, regions, states, cities, counties, zip codes), and/or data associated with one or more time periods (e.g., hours, days, weeks, months, years). In some examples, service provider processing system 104 receives transactional data describing both sides of a transaction and other subsequent related transactions flowing through one or more merchant systems 102A-102N.

One or more server machines 110 each may include one or more web servers 120 and/or one or more application servers 122. For example, web servers 120 may provide text, audio, image, and video content to and from server machines 110, and or other computer system or communication channels. Web servers 120 also may provide web-based application services, business logic, and updates to server machines 110 and/or other computer systems or communication channels.

In some examples, web servers 120 are coupled to one or more respective application servers 122 that provide application services, data, business logic, and/or APIs to various server machines 110, merchant systems 102A-102N, merchant engagement channels 106A-106N and/or other systems. In other examples, application servers 122 may provide one or more such services independently, without use of web servers 120.

In some examples, web servers 120 may provide server machines 110, merchant systems 102A-102N, merchant engagement channels 106A-106N and/or other system with access to one or more application server 122 services associated with integration issue resolution system 130. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In some examples, merchant systems 102A-102N and/or other types of client and server devices may include an application associated with a service provided by one or more server machines 110 (e.g., integration issue resolution system 130). For example, various types of computing devices (e.g., smart phones, smart televisions, tablet computers, smart wearable devices, smart home computer systems, etc.) may use specialized applications to access services provided by server machines 110, to issue commands to server machines 110, and/or to receive content from server machines 110 without visiting or using web pages.

One or more server machines 110 each may include an integration issue resolution system 130 comprising one or more of a transactional data analyzer 140, an issue detection manager 150, a channel interface manager 160, and/or an optimization manager 170, which may be combined, divided, and organized in various arrangements on one or more computing devices. In addition, server machines 110 may store or access one or more issue detection models 180 for use by integration issue resolution system 130 and/or other systems. Such issue detection models 180 may include, for example, one or more setting optimization models 182, one or more error detection models 184, one or more content recommendation models 186, one or more merchant classification models 188, and/or any number of other types of supervised or unsupervised statistical, machine-learning, or other types models.

In various examples, integration issue resolution system 130 provides automated and/or semi-automated integration issue detection, application and setting optimization recommendations, and/or error correction for integration between any two or more computer systems and/or applications. In some examples, integration issue resolution system 130 generally may provide such services between individual merchant systems 102A-102N of different merchants and service provider processing system 104. However, such automated and/or semi-automated detection, optimization, and/or error correction is not limited to any particular type of computer system(s) and/or application(s).

In various examples, integration issue resolution system 130 includes transactional data analyzer 140, which generally may receive, process, consolidate, aggregate, and/or associate various types of transactional data 192 associated with different merchants. In some examples, transactional data analyzer 140 prepares data to be analyzed by issue detection manager 150 and/or analyzed based on one or more issue detection models 180. In some examples, transactional data analyzer 140 also may classify merchants into one or more specified and/or unspecified categories or groups based on transactional data 192 associated with each respective merchant. (e.g., common attributes, common behavior, using clustering, etc.).

In various examples, integration issue resolution system 130 includes issue detection manager 150 for detecting issues (e.g., application errors, application setting errors, application setting inefficiencies, integration errors, etc.) and identifying one or more recommendations to resolve detected issues. For example, issue detection manager 150 may detect inefficiencies associated with application settings of respective merchant systems 102A-102N and/or integration errors occurring between respective merchant systems 102A-102N and a service provider system. In various examples, issue detection manager 150 also identifies one or more potential optimizations and/or corrections for respective merchant systems 102A-102N based on output from one or more different issue detection models 180.

In various examples, issue detection manager 150 may receive, access, and/or work directly or indirectly with transactional data analyzer 140 to process various types of transactional data 192 generated in association with different merchant systems 102A-102N. In some examples, issue detection manager 150 uses one or more issue detection models 180 to detect potential and/or actual issues associated with an application, merchant system 102A-102N and/or integration involving multiple systems.

Issue detection models 180 generally refer to any one or more rule-based, statistical, and/or machine learning models used to analyze transactional data 192 associated with and/or across merchant systems 102A-102N of different merchants. In some examples, each of one or more different issue detection models 180 may include any combination of rules, statistical analysis (e.g., cluster analysis, regression analysis, etc.), and/or machine learning to detect inefficiencies and/or errors in and between various applications and computer systems. In addition, such models may be supervised or unsupervised. In various examples, transactional data 192 associated with one or more respective merchants is analyzed in view of transactional data across other merchants to determine whether a merchant system is experiencing issues and/or is optimally configured as compared to peers.

In various examples, issue detection models 180 may include one or more types of issue detection model types, including but not limited to, one or more of setting optimization models 182, error detection models 184, content recommendation models 186, and/or merchant classification models 188. Setting optimization models 182 generally may refer to any models that detect one or more inefficiencies or other issues with user, application, and/or system settings. Such models also may identify one or more recommended improvements or optimizations to associated settings. Similarly, error detection models 184 may detect errors occurring within or between applications and/or systems, for example as part of systems integration.

Content recommendation models 186 generally may detect issues with the information, layout, size, color, and other aspects associated with checkout and/or payment content displayed to users in association with a respective merchant system (e.g., merchant A system 102A). Also, merchant classification models 188 may be used to classify or categorize merchants according to one or more structured and/or unstructured categories. For example, merchants may be classified based on associated transactional data prior analyzing merchant data according to one or more other issue detection models 180. As such, transactional data of similarly classified merchants may be analyzed together to provide accurate issue detection and meaningful corresponding optimization and corrections.

In various examples, transactional data 192 may be analyzed based on a sequence of one or more issue detection models, for example, based on a standard set of models, based on one or more integration attributes, based on one or more active merchant settings, based on one or more inactive merchant settings, based on a classification of a merchant, based on one or more active and/or inactive merchant checkout settings, based on one or more active and/or inactive merchant payment account settings, based on one or more merchant administrative settings, based on whether a merchant operates and controls their own website, based on whether a merchant relies on a partner website, and/or based on any one or more different factors.

In various examples, sequencing or processing order of issue detection models 180 may be fixed or unfixed. In addition the ordering or sequencing of model processing may be controlled and/or provided globally, across a group of one or more selected merchant systems, based on an automated merchant group classification, and/or by one or more respective merchants. For example, a default ordering or sequencing of error detection model processing may be provided automatically. In addition, the default or existing stored sequencing or ordering then may be updated or modified one or more times by a merchant user, by service provider user, and/or both (e.g., over any period of time). Further, output of any one or more issue detection models 180 may serve as input for any one or more issue detection models 180.

In an example, issue detection manager 150 runs detected integration issues through one or more sets of suppression rules to filter and/or calibrate detected integration issues based on relevant factors. For example, suppression rules may include additional suppression rules or models that are associated with or defined for an entire system, an application, one or more individual merchants, and/or a group or classification one or more merchants. In some examples, suppression rules may reduce or eliminate false positives, irrelevant detected issues, and/or unwanted issue detection data or feedback. For example, suppression rules may filter detected issues that are not applicable to a merchant's configuration, a merchant's settings, and/or based on any one or more other factors. In some examples, suppression rules may be applied at one time (e.g., after running one or more issue detection models) or at one or more various times (e.g., between running one or more issue detection models).

In various examples, issue detection manager 150 stores filtered and/or unfiltered output of issue detection models 180 in one or more data stores 190. Issue detection manager 150 also analyzes issue detection output generated by one or more various issue detection models 180 to determine whether one or more optimizations, fixes, and/or suggestions are available to address or potentially address detected issues. In some examples, issue detection manager 150 analyzes one or more databases or data stores 190 to identify one or more optimizations and/or corrections to recommend to a merchant.

Optimizations and corrections generally may be identified based on analyzing transactional data 192 associated with other similar merchants and/or based on searching existing knowledge base solutions and/or source code repositories. Such knowledge base solutions may include text, images, audio, video or generally any other type of data that may be used to present a recommended optimization or solution to a user. In addition, source code repositories may include patches, scripts, configuration updates, code snippets, executable code, uncompiled code, or other similar data that can be applied automatically or by a user to correct a detected issue. In some examples, one or more outputs of various respective issue detection models 180 also may be associated with one or more recommendations, optimizations, and/or corrections.

In various examples, channel interface manager 160 generates one or more merchant engagement channels for one or more specific merchants (e.g., merchant A engagement channel(s) 106A, merchant B engagement channel(s) 106B, merchant engagement channel(s) 106N). Merchant engagement channels 106A-106N generally refer to one or more different communication channels that are generated for and provided to one or more specific merchants to deliver error detection information, optimization recommendations, automated and/or semi-automated error correction data, reports, and/or other associated information.

In some examples, merchant engagement channels 106A-106N may include, but are not limited to, merchant-specific integration reporting websites, portals, web parts, and/or content provisioning. In some examples, merchant engagement channels 106A-106N may be representational state transfer application programming interfaces (i.e., RESTful APIs) or any other type of API generated for a merchant to deliver integration error detection, correction, or optimizations to merchants. Such APIs may be used to provide merchants with information describing checkout transaction processing statistics, checkout conversion rates, detected integration issues, recommended solutions to detected integration issues, and/or automated or semi-automated ways to implement recommended optimizations or corrections.

In various examples, optimization manager 170 receives data associated with an identified optimization or error correction based on a detected issue and applies one or more optimizations and/or corrections automatically, based on user input, based on one or more system attributes, and/or based on one or more merchant settings. For example, optimization manager 170 may set or reset one or more settings associated with one or more respective merchant systems 102A-102N, a user account associated with one or more respective merchant systems 102A-102N, or settings of service provider processing system 104 to provide an optimization or correction that addresses a detected issue. In some examples, optimization manager 170 applies optimizations and/or recommendations in response to user input or approval, while in other examples optimization manager 170 applies optimizations and/or recommendations automatically without specific user input or direction.

Figure 2:
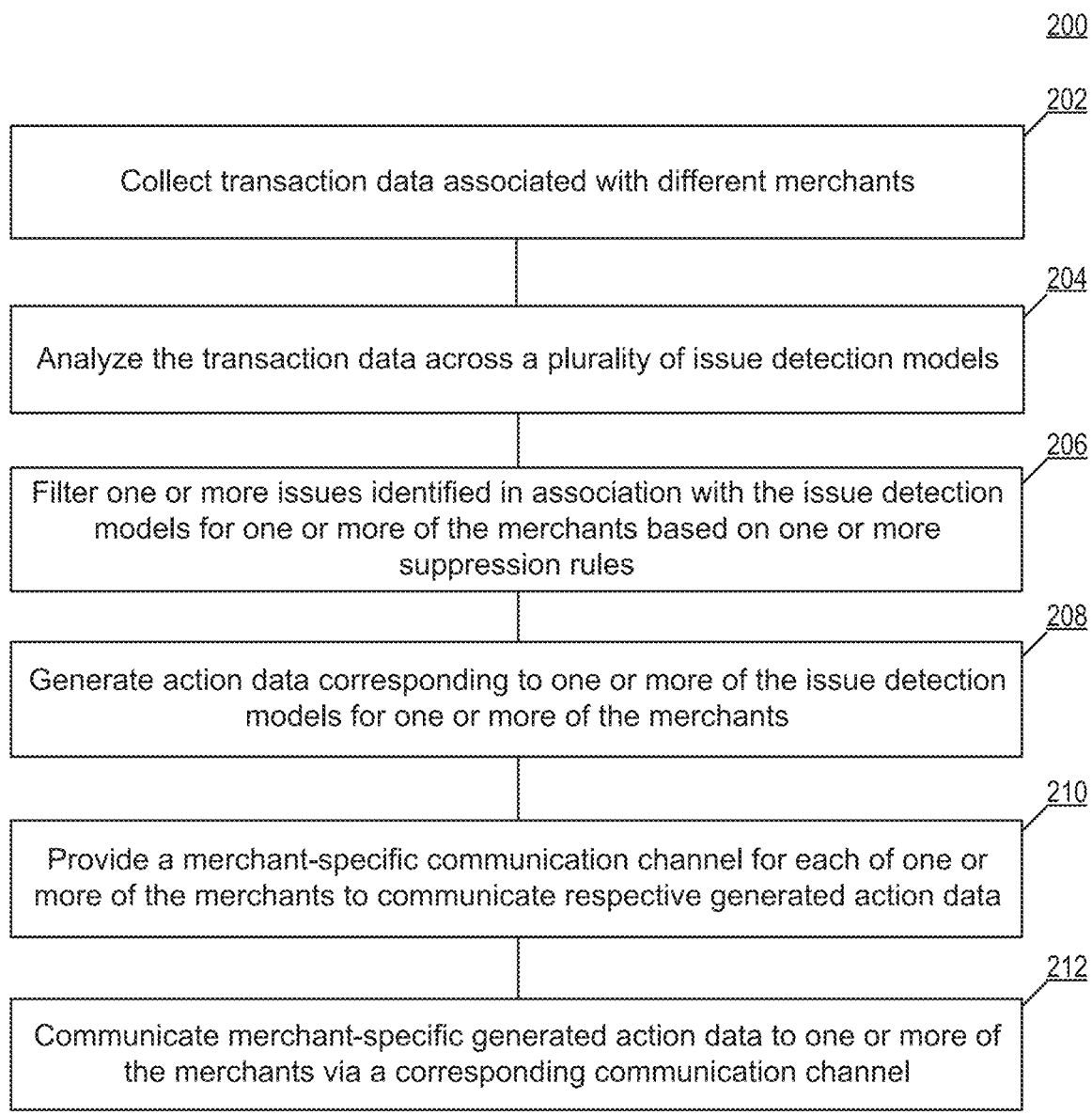
FIG. 2 is a flow diagram for providing integration issue detection and correction in accordance with examples of the present disclosure.

FIG. 2 is a flow diagram for providing integration issue detection and correction. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof.

Method 200 begins at block 202 when transactional data analyzer 140 of integration issue resolution system 130 collects transactional data 192 associated with different merchants. In an example, transactional data analyzer 140 collects and analyzes transactional data 192 generated in association with application and system interactions between one or more different merchant systems 102A-102N and service provider processing system 104.

In various examples, transactional data analyzer 140 receives and analyzes transactional data 192 from one or more merchant systems 102A-102N or service provider processing system 104 in real-time and/or periodically on a scheduled or unscheduled basis. Various examples of transactional data 192 are discussed in further detail above in association with FIG. 1.

In some examples, transactional data analyzer 140 analyzes various shopping cart data, checkout process data, payment service data, application logs and data, and/or system integration logs or data (e.g., from any one or more different merchants and/or service providers). In addition, transactional data analyzer 140 also may integrate and associate such data to generate statistics describing the accuracy and efficiency of shopping cart, checkout, and payment processes associated with one or more merchant systems 102A-102N. Further, transactional data analyzer 140 may analyze and prepare transactional data 192 for further analysis and processing using one or more issue detection models 180, for example, in association with issue detection manager 150.

At block 204, issue detection manager 150 of integration issue resolution system 130 analyzes the transaction data 192 across a plurality of issue detection models 180. In various examples, issue detection manager 150 receives raw and/or analyzed transactional data 192 associated with one or more merchant systems 102A-102N from transactional data analyzer 140. Issue detection manager 150 then may provide transactional data 192 to one or more issue detection models 180 for detecting application errors and inefficiencies, integration errors, and/or application setting errors and inefficiencies for one or more merchant systems 102A-102N of different merchants. Issue detection models 180 then generally analyze respective transaction data 192 across merchant systems 102A-102N of different merchants (e.g., similar merchants, all merchants, groups or classifications of merchants, etc.) to detect issues, which may include comparing one or more performance-related aspects of one merchant system (e.g., merchant A system 102A) to one or more other merchant systems (e.g., merchant B system 102B, merchant N system 102N).

In various examples, issue detection models 180 may include any one or more of setting optimization models 182, error detection models 184, content recommendation models 186, merchant classification models 188, and/or any other types of error detection and correction and detection models. Such models, both individually and aggregately may comprise any combination of rule-based, statistical, and/or machine learning analysis to detect inefficiencies and/or errors within and between various different applications and computer systems. In addition, issue detection models may be supervised or unsupervised, and output of one or more different issue detection models 180 may serve as input for any one or more of such models. Further, issue detection manager 150 may perform issue detection based on any sequence, ordering, or combination of issue detection models 180.

At block 206, issue detection manager 150 of integration issue resolution system 130 filters one or more issues identified in association with the issue detection models for one or more of the merchants based on one or more suppression rules.

In various examples, issue detection manager 150 receives issue detection output from one or more issue detection models and determines whether one or more respective merchant systems 102A-102N of different merchants are associated with detected issues. In some examples, issue detection manager may filter and further associate output of issue detection models 180 for each of one or more different merchants.

In various examples, issue detection manager 150 filters the output of one or more of issue detection models 180 based on one or more suppression rules and/or suppression models to refine the output of issue detection models 180 to reduce false positive results or results that are inapplicable to a merchant's configuration, merchant classification, and/or integration. For example, suppression rules and/or suppression models filter output of issue detection models to avoid inaccurate issue detection reporting and recommendations.

At block 208, issue detection manager 150 of integration issue resolution system 130 generates action data corresponding to one or more of the issue detection models for one or more of the merchants. In various examples, issue detection manager 150 takes filtered and/or unfiltered output from one or more issue detection models 180 and identifies one or more corresponding optimizations and/or corrections. In some examples, issue detection manager 150 searches one or more data stores 190 comprising information, recommendations, settings, code, and/or other similar artifacts associated with each of multiple different system issues (e.g., merchant system, checkout system, payment system, service provider processing system 104).

In an example, setting optimization models 182 may detect that a particular merchant system (e.g., merchant A system 102A) could increase an overall number of completed transactions by allowing cross-border transactions, by accepting additional payment options, and/or by providing one or more additional shipping options based on comparing performance of the merchant system to other merchant systems. Detection output generated by setting optimization model 164 then may be used by issue detection manager 150 to search one or more knowledge bases and/or source code repositories to identify one or more associated descriptions, recommendations, optimizations, and/or corrections to address the detected issue.

In other examples, error detection models 184 may detect one or more application programming interface issues occurring between a merchant system and a service provider system. In addition, content recommendation models 186 may detect one or more content placement and presentation optimizations to apply to a merchant system to improve checkout conversion rates. Further, other types of issue detection models may determine opportunities to cross-sell and upsell other products and services as part of a checkout process.

At block 210, channel interface manager 160 of integration issue resolution system 130 provides a merchant specific communication channel for each of one or more of the merchants to communicate respective generated action data. In some examples, channel interface manager 160 may generate and manage one or more private communication channels for each of one or more different merchants (e.g., merchant A engagement channel(s) 106A, merchant B engagement channel(s) 106B, merchant N engagement channel(s) 106N). For example, each merchant and/or merchant system may receive communications and information from integration issue resolution system 130 via one or more of their own separate communication channels.

In some examples, a communication channel may be an application programming interface (API), such as a RESTful API or any other type of interface that provides merchants with information describing checkout transaction processing statistics, checkout conversion rates, detected integration issues, recommended solutions to detected integration issues, and/or automated or semi-automated ways to implement recommended optimizations or corrections. In some examples, a merchant may consume a RESTful API to receive and utilize integration issue resolution system data, for example, as a merchant engagement website, portal, web parts, report, alert system, etc.

At block 212, optimization manager 170 of integration issue resolution system 130 communicates merchant-specific generated action data to one or more of the merchants via a corresponding communication channel. In some examples, integration issue resolution system 130 provides a merchant engagement portal that presents website, checkout, payment service, and other merchant performance based on transactional data 192.

In various examples, channel interface manager 170 delivers content associated with a merchant's engagement portal, which may include information describing one or more detected issues and one or more suggested optimizations and/or corrections. Examples of associated user interfaces are described in further detail below with respect to FIGS. 3-6.

In various examples, one or more user interfaces provided via a merchant engagement channel (e.g., merchant A engagement channel(s) 106A) may provide information describing a detected condition, one or more options for resolving the detected condition, and/or one or more options for a user to make or adopt a recommended change or update to a merchant system (e.g., merchant A system 102A). As such, in some examples, a user may be presented with one or more user interface controls that allow a user to accept, adopt, or implement a recommended correction for a detected issue.

In some examples, optimization manager 170 checks one or more merchant configuration settings to determine whether the merchant wishes to adopt or automatically accept any of one or more different types of recommendations (e.g., optimization) from integration issue resolution system 130. For example, optimization manager 170 may determine that a merchant has enabled an auto-accept option for one or more different types of issue recommendations. In such examples, optimization manager 170 generally then may proceed with implementing a recommended optimization or error correction routine.

In some examples, optimization manager 170 uses a merchant engagement channel (e.g., merchant A engagement channel 106A) implemented as a RESTful API to apply one or more optimizations, corrections, and/or code fixes directly on the merchant's system (e.g., merchant A system 102A). Similarly, optimization manager 170 may apply such updates to service provider system 104, corresponding integration code between systems, and/or any other computer systems.

In some examples, a RESTful API is provided to automatically detect API call errors on a merchant system. Thus, optimization manager 170 may update one or more aspects of a merchant system, including checkout configuration, system configuration, and/or application code without any user involvement. For example, a merchant checkout system may be automatically updated by optimization manager 170 using a recommended optimization or error correction fix so that the next instantiation of the merchant's checkout system is provided with the optimization or fix. As such, optimization manager 170 generally may perform automated and/or semi-automated (e.g., user confirmed) issued detection and correction for merchant systems 102A-102N of different merchants.

Figure 3:
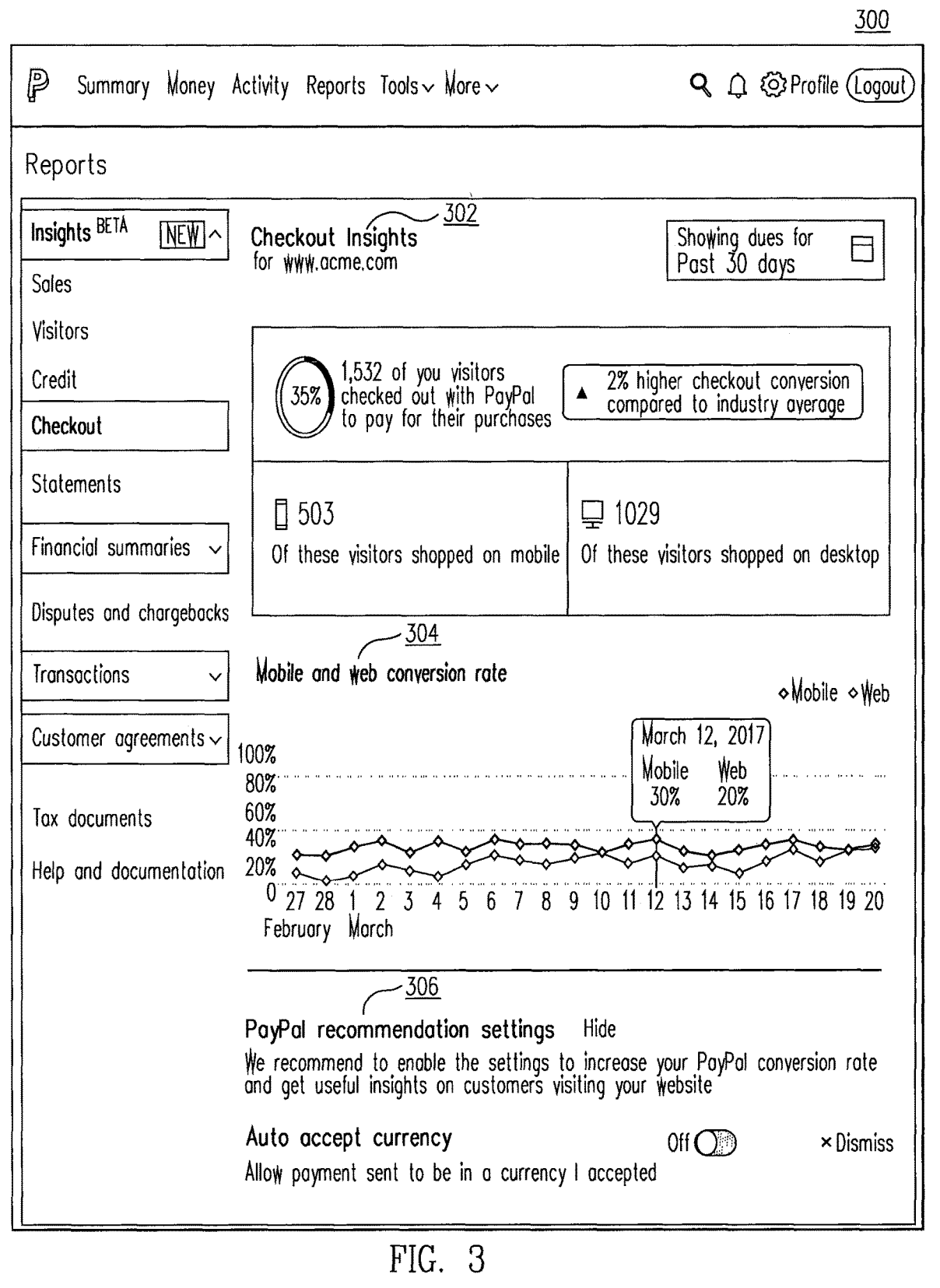

FIG. 3 is an example checkout insights user interface 300 generated for a merchant. For example, each of one or more different merchants may be provided with a merchant-specific checkout insights user interface via one or more merchant-specific merchant engagement channels (e.g., merchant A engagement channel(s) 106A for merchant A, merchant B engagement channel(s) 106B, merchant N engagement channel(s) 106N). In various examples, checkout insights user interface 300 provides each merchant with their own view of checkout data including checkout conversion statistics.

In an example, checkout insights user interface 300 generally may include a first reporting area 302 that provides various website statistics, visitor data, and transaction information. In addition, a second reporting area 304 may include checkout conversion rate statistics and associated visualizations (graphs, charts, etc.). Further, an additional configuration area 306 of checkout insights user interface 300 may present recommended optimizations and/or error correction options, which can be viewed, accepted, or dismissed by a merchant.

In some examples, merchant adoption and/or dismissal of recommended optimizations and error corrections may be tracked across different merchants. In addition, such data also may be supplied or used in the training or improvement of associated issue detection models 180 as a form of supervised learning. Also, such recommendations may be shown up to a certain number of times based on a threshold (e.g., 2, 5, 7) if the recommendations have not been adopted or dismissed. In some examples, a recommendation may be removed when a merchant indicates that an associated optimization or correction was implemented, for example in a separate course of action by the merchant. However, the recommendation may be shown again at a later time based on a predetermined threshold (e.g., 15, 30, 45 days) if integration issue resolution system 130 detects that the recommendation was not implemented for some reason (e.g., incorrectly, unintentionally, forgotten) or that the recommendation was implemented and later abandoned or changed.

Figure 4:
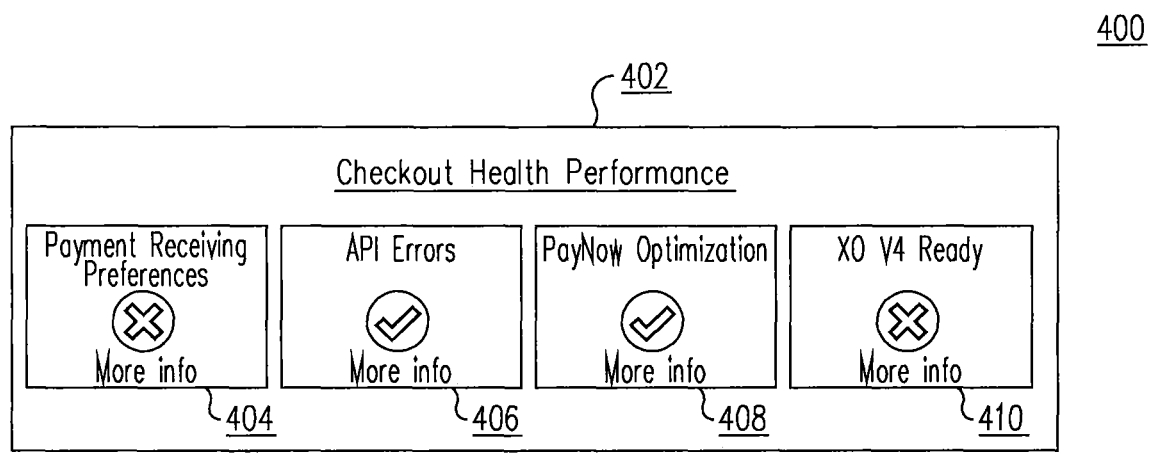
FIG. 4 is an example user interface for merchant checkout health performance in accordance with examples of the present disclosure.

For example, FIG. 4 illustrates an example user interface for merchant checkout health performance. Checkout health performance user interface 400 generally may be provided as part of any user interface, including for example in association with a user interface similar to checkout insights user interface 300.

Checkout health performance user interface 400 provides an aggregated quick summary 402 of key checkout performance status indicators. For example, a payment receiving preferences status indicator 404 may indicate whether or not associated preferences are optimized. An application programming interface (API) status indicator 406 may indicate whether existing or unresolved API errors have been detected between a merchant system and service provider processing system 104. A payment optimization status indicator 408 may indicate whether payment services associated with a checkout process are performing optimally. In addition, a version readiness or compatibility indicator 410 may indicate whether or not an existing checkout process is compatible with newer releases. In various examples, optimization status indicators 404-410 provide associated navigation controls or links allowing a user to drill down into further detail to obtain more insight about the given reported status of a checkout system.

For example, FIG. 5 illustrates a user interface 500 providing additional details about the most frequent application programming interface (API) errors 502 associated with a merchant shopping, checkout, and/or payment implementation. User interface 500 also may include or link to one or more corrective actions 504. For example, users may be able to implement one or more corrective actions directly, generally via any type of user interface. In addition, user interface 500 may include checkout optimization recommendations and corrective actions 506, which may be descriptive and/or actionable via the user interface. User interface 500 also may include additional recommendations, for example, regarding additional available services, available upgrades, etc.

FIG. 6 is an example user interface 600 that includes one or more pre-set optimization recommendations 602 that are ready for user acceptance and approval. For example, such optimization recommendations may be provided to users in association with a checkout insights user interface 300, a link to one or more corrective actions 504, during account setup, during account configuration, and/or generally at any time. A user then may automatically accept the pre-set recommendations using a user interface control (e.g., a "save" button). A user also may modify one or more of the recommendations by toggling a setting or control, or by changing a value.

Figure 7:
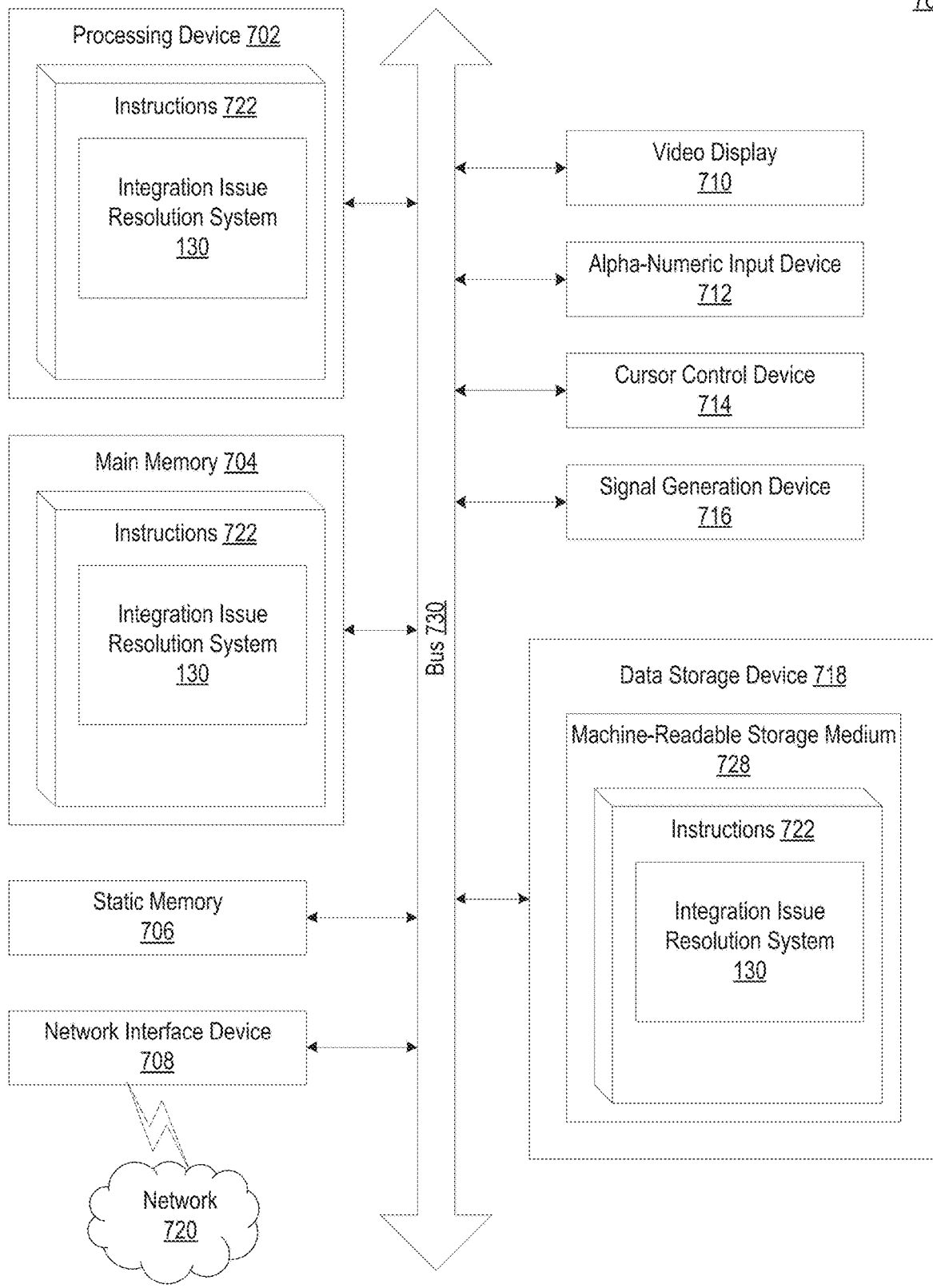
FIG. 7 is a block diagram of an exemplary computer system that may perform one or more of the operations described herein.

FIG. 7 illustrates a diagram of a machine in the exemplary form of a computer system 700, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 also may be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 also may include a network interface device 708. The computer system 700 may further include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 on which is stored one or more sets of instructions 722 (e.g., software computer instructions) embodying any one or more of the methodologies or functions described herein. The instructions 722 also may reside, completely or at least partially, within the main memory 704 and/or within the processor 702 during execution thereof by the computer system 700, the main memory 704 and the processor 702 also constituting computer-readable storage media. The instructions 722 may be transmitted or received over a network 720 via the network interface device 708.

In one example, the instructions 722 include instructions for one or more modules of a risk detection system (e.g., integration issue resolution system 130 of FIG. 1) and/or a software library containing methods that call integration issue resolution system. While the computer-readable storage medium 728 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
  a non-transitory memory storing instructions; and
  one or more hardware processors coupled to the non-transitory memory and configured to read the instructions from the non-transitory memory to cause the computer system to perform operations comprising:
  collecting transaction data for each entity system of a plurality of entity systems;
  based on one or more suppression rules, filtering out one or more inapplicable issues that will not be analyzed using a plurality of issue detection models;
  analyzing the transaction data for each entity system using the plurality of issue detection models;
  based on the analyzing the transaction data for each entity system, determining an analysis result for each entity system;
  comparing the analysis result of each entity system to analysis results of other entity systems of the plurality of entity systems;
  respectively generating, for each entity system of the plurality of entity systems, one or more system optimization recommendations associated with detected issues of the entity system based on the comparison of analysis results; and
  providing each entity system of the plurality of entity systems with the respectively generated one or more system optimization recommendations.

2. The computer system of claim 1, wherein one or more of the suppression rules are associated with a class of entity systems.

3. The computer system of claim 1, wherein the operations further comprise:
  providing, for each of the plurality of entity systems, a communication channel for communicating the respectively generated one or more system optimization recommendations.

4. The computer system of claim 3, wherein one or more of the communication channels is an application programming interface.

5. The computer system of claim 1, wherein the plurality of issue detection models comprise at least one statistical model and at least one machine learning model.

6. The computer system of claim 1, wherein the issue detection models comprise at least one setting optimization model and at least one integration error detection model.

7. The computer system of claim 1, wherein the operations further comprise:
  updating one or more account settings for an entity system of the plurality of entity systems based on the respectively generated one or more system optimization recommendations for the entity.

8. The computer system of claim 1, wherein the operations further comprise:
  automatically updating a user interface between an entity system and one or more service provider computer systems based on the respectively generated one or more system optimization recommendations for the entity system.

9. A non-transitory machine-readable medium having stored thereon machine-readable instructions executable to cause a machine to perform operations comprising:
    collecting transaction data for a plurality of merchant systems, wherein each merchant system corresponds to a different merchant;
    based on one or more suppression rules, filtering out one or more inapplicable issues that will not be analyzed using a plurality of issue detection models;
    analyzing the transaction data for each merchant system using the plurality of issue detection models;
    based on the analyzing the transaction date for each merchant system, determining an analysis result for each merchant system;
    comparing the analysis result of each merchant system to analysis results of other merchant systems of the plurality of merchant systems;
    respectively generating, for each merchant system, a system optimization recommendation based on the comparison of analysis results; and
    providing each system optimization recommendation to the respective merchant system.

10. The non-transitory machine-readable medium of claim 9, wherein the operations further comprise:
    providing, for each merchant system of the plurality of merchant systems, a communication channel for communicating the respectively generated system optimization recommendation.

11. The non-transitory machine-readable medium of claim 9, wherein the operations further comprise:
    updating one or more account settings for a merchant system of the plurality of merchant systems based on the respectively generated system optimization recommendation for the merchant system.

12. The non-transitory machine-readable medium of claim 9, wherein the issue detection models comprise at least one setting optimization model and at least one integration error detection model.

13. The non-transitory machine-readable medium of claim 9, wherein the operations further comprise:
    automatically updating a user interface between an entity system and one or more service provider computer systems based on the respectively generated one or more system optimization recommendations for the entity system.

14. The non-transitory machine-readable medium of claim 9, wherein the plurality of issue detection models comprise at least one statistical model and at least one machine learning model.

15. A computer-implemented method, comprising:
    collecting, by one or more computing devices, transaction data for each entity system of a plurality of entity systems;
    based on one or more suppression rules, filtering out one or more inapplicable issues that will not be analyzed using a plurality of issue detection models;
    analyzing, by the one or more computing devices, the transaction data of each entity system using the plurality of issue detection models;
    based on the analyzing, determining an analysis result for each entity system;
    comparing the analysis result of each entity system to analysis results of other entity systems of the plurality of entity systems;
    respectively generating, by the one or more computing devices, for each entity system of the plurality of entity systems, a system optimization recommendation based on the comparison of analysis results; and
    providing, by the one or more computing devices, the system optimization recommendation to each respective entity system.

16. The computer-implemented method of claim 15, further comprising:
    providing, for each entity system of the plurality of entity systems, a communication channel for communicating the respectively generated system optimization recommendation.

17. The computer-implemented method of claim 16, wherein one or more of the communication channels comprises an application programming interface.

18. The computer-implemented method of claim 16, wherein one or more of the communication channels are RESTful application programming interfaces.

19. The computer-implemented method of claim 15, further comprising:
    updating one or more account settings for an entity system of the plurality of entity systems based on the respectively generated system optimization recommendation for the entity system.

20. The computer-implemented method of claim 15, wherein the issue detection models comprise at least one setting optimization model and at least one integration error detection model.

* * * * *